(12) United States Patent
Kuroda et al.

(10) Patent No.: US 7,934,931 B2
(45) Date of Patent: May 3, 2011

(54) ROTATING CONNECTOR ATTACHMENT STRUCTURE

(75) Inventors: Nagao Kuroda, Miyagi-Ken (JP);
Tomokazu Ito, Miyagi-Ken (JP)

(73) Assignee: Alps Electronic Co., Ltd., Tokyo (JP)

( * ) Notice: Subject to any disclaimer, the term of this patent is extended or adjusted under 35 U.S.C. 154(b) by 0 days.

(21) Appl. No.: 12/709,247

(22) Filed: Feb. 19, 2010

(65) Prior Publication Data
US 2010/0216318 A1 Aug. 26, 2010

(30) Foreign Application Priority Data
Feb. 25, 2009 (JP) ................................. 2009-042374

(51) Int. Cl.
*H01R 39/00* (2006.01)

(52) U.S. Cl. .......................................................... 439/15
(58) Field of Classification Search .............. 439/11–15, 439/164

See application file for complete search history.

(56) References Cited

U.S. PATENT DOCUMENTS

| | | | |
|---|---|---|---|
| 2004/0102070 A1* | 5/2004 | Besier et al. | 439/164 |
| 2007/0004236 A1* | 1/2007 | Suenaga | 439/15 |
| 2007/0178723 A1* | 8/2007 | Kataoka et al. | 439/76.2 |
| 2007/0270008 A1* | 11/2007 | Laing | 439/192 |
| 2009/0156034 A1* | 6/2009 | Araki et al. | 439/164 |
| 2009/0176393 A1* | 7/2009 | Asakura et al. | 439/164 |
| 2009/0203232 A1* | 8/2009 | Ida et al. | 439/15 |

FOREIGN PATENT DOCUMENTS
JP 2008-18864 1/2008
* cited by examiner

*Primary Examiner* — Jean F Duverne
(74) *Attorney, Agent, or Firm* — Beyer Law Group LLP (57) ABSTRACT

An attachment structure is provided for attaching a stator member of a rotating connector to a bracket fitted into a steering column while being positioned. The bracket is provided with engaging recess grooves having first and second reference surfaces each orthogonal to each other, which are arranged along the axial direction of a steering shaft, and the stator member is provided with engaging protrusions respectively inserted into the corresponding engaging recess grooves. An elastic tongue piece for elastically urging the engaging protrusions on the first reference surface is formed in the engaging recess groove. Elastic tongue pieces for elastically urging the engaging protrusions on the second reference surfaces are formed on the engaging protrusions.

5 Claims, 7 Drawing Sheets

ROTATING CONNECTOR ATTACHMENT STRUCTURE

CLAIM OF PRIORITY

This application claims benefit of the Japanese Patent Application No. 2009-042374 filed on Feb. 25, 2009, which is hereby incorporated by reference.

BACKGROUND OF THE INVENTION

1. Field of the Invention

The present invention relates to an attachment structure for attaching a rotating connector used as an electric coupling member for such component as an airbag system of an automobile to a steering column via a bracket.

2. Description of the Related Art

The rotating connector attached to a steering device of the automobile is formed by storing and winding a flat cable in annular space between a stator member and a rotor member while allowing the stator member to rotatably support the rotor member. It may be employed as the member for electrically coupling an airbag inflator or a horn installed in a steering wheel with limited number of rotation with a control circuit and the like installed in the automotive body. Generally, the rotating connector of the aforementioned type is positioned so as to be attached to the bracket fitted into the cylindrical steering column which encloses the steering shaft.

Japanese Unexamined Patent Application Publication No. 2008-18864 discloses the rotating connector attachment structure as described above which allows the stator of the rotating connector to be positioned with respect to the bracket at the side of the steering column by inserting one guide pin into the other guide hole, and then fixed through screwing or snap connection.

In the aforementioned generally employed rotating connector attachment structure, a predetermined clearance has to be formed between the guide pin and the guide hole for positioning. Such process as screwing and snap connection may fail to accurately define the relative positional relationship between the stator member and the bracket in the plane direction orthogonal to the axial direction of the steering shaft, which is likely to cause looseness between the stator member of the rotating connector and the bracket at the side of the steering column. It is therefore difficult to attach the rotating connector to the steering column with high positioning accuracy.

The known rotating connector attachment structure for eliminating the looseness between the stator member of the rotating connector and the bracket at the side of the steering column is structured to cause the crash rib protruding from the stator member to be urged and crashed against the inner wall surface of the bracket as the rotating connector is assembled with the bracket. With this structure, once the rotating connector is removed from the steering column for the service or the inspection, it cannot be attached to the steering column with high positioning accuracy again.

SUMMARY OF THE INVENTION

The present invention provides an attachment structure for attaching a rotating connector repeatedly with high positioning accuracy while allowing easy positioning operation.

The present invention provides a rotating connector attachment structure for attaching a stator member of a rotating connector having a rotor member rotatably assembled with the stator member to a bracket fitted into a steering column. The structure has plural engaging recess grooves formed in the bracket, having first and second reference surfaces which are orthogonal to each other and arranged along an axial direction of a steering shaft. The stator member is provided with plural engaging protrusions respectively inserted into the plural engaging recess grooves along the axial direction. A first elastic tongue piece for elastically urging the engaging protrusion on the first reference surface is formed on the engaging protrusion or in the engaging recess groove, and second elastic tongue pieces for elastically urging the engaging protrusions on the second reference surfaces is formed on the engaging protrusions or in the engaging recess grooves.

When the rotating connector is attached to the bracket with the attachment structure, plural engaging protrusions formed on the stator member are inserted into plural engaging recess grooves formed in the bracket such that the engaging protrusions may be urged on the first reference surface or the second reference surface of the engaging recess groove under the reaction force of the first or the second elastic tongue piece. This makes it possible to easily position the stator member with respect to the first and the second reference surfaces with high accuracy, and accordingly, to easily define the relative positional relationship between the stator member and the bracket in the plane direction orthogonal to the axial direction of the steering shaft. The thus positioned rotating connector may be fixed to the bracket through screwing or snap connection so as to keep the high positioning accuracy even when the rotating connector is removed from the steering column and then attached again.

In the structure, preferably, the stator member of the rotating connector is provided with the engaging protrusions at two positions in a circumferential direction at an angular interval of approximately 180°. The bracket is provided with the engaging recess grooves at two positions corresponding to the engaging protrusions. The structure allows minimum numbers of the engaging protrusions and recess grooves to perform the positioning with high accuracy.

In this case, preferably, one of the first and the second elastic tongue pieces is formed in the engaging recess groove, and the other elastic tongue piece is formed on the engaging protrusion. This makes it possible to form the plural elastic tongue pieces effortlessly. Furthermore, a line for connecting the pair of engaging recess grooves is substantially orthogonal to the first reference surface, and is substantially in parallel with the second reference surface. The first elastic tongue piece is formed in one of the pair of engaging recess grooves, and the second elastic tongue pieces are provided on the pair of the engaging protrusions. Only three elastic tongue pieces may be formed, thus simplifying the structure.

Preferably, plural snap claws are formed on the stator member so as to be fixed to the bracket by performing a snap connection between the snap claws and the bracket. As a result, not only positioning of the rotating connector but also fixing operation may be easily performed, thus considerably improving the operability upon attachment.

With the attachment structure according to the present invention, upon attachment of the rotating connector to the bracket, the plural engaging protrusions formed on the stator member are inserted into the plural engaging recess grooves formed in the bracket at the side of the steering column. This may urge the engaging protrusions on the first and the second reference surfaces of the engaging recess grooves under the reaction force of the first and the second elastic tongue pieces. Then the relative positional relationship between the stator member and the bracket in the plane direction orthogonal to the axial direction of the steering shaft may be defined with high accuracy while allowing the stator member to be positioned with respect to the first and the second reference surfaces with ease and high accuracy. The thus positioned rotating connector may further be fixed to the bracket through screwing or snap connection so as to keep the high positioning accuracy upon re-attachment of the rotating connector which has been removed from the steering column.

DESCRIPTION OF THE PREFERRED EMBODIMENTS

An embodiment of the present invention will be described referring to FIGS. 1 to 9. In the embodiment, a rotating connector 1 is attached to a bracket 2 through snap connection, and the bracket 2 is fitted into a not shown steering column with high positioning accuracy. Stalk switches 3 (one of them is omitted in the drawing) are provided at left and right sides of the bracket 2. As is well known, the steering column has a cylindrical body for enclosing the steering shaft. The rotating connector 1 and the bracket 2 have center holes 10 and 20, respectively for allowing the steering shaft to penetrate therethrough. A chain line L shown in FIG. 1 denotes a center line extending through each center of the center holes 10 and 20 along the axial direction of the steering shaft.

The rotating connector 1 serves as an electric coupling member for electrically coupling an airbag inflator, a horn circuit and the like installed in the steering wheel with limited number of rotation with the vehicle body. The rotating connector 1 is mainly formed of a rotor member 11 with a hollow shaft structure connected to the steering wheel, a stator member 12 for rotatably supporting the rotor member 11, and a not shown flat cable which is stored and wound in the annular space defined by the rotor member 11 and the stator member 12. Each of the rotor member 11 and the stator member 12 is formed by molding the synthetic resin material.

Figure 2:
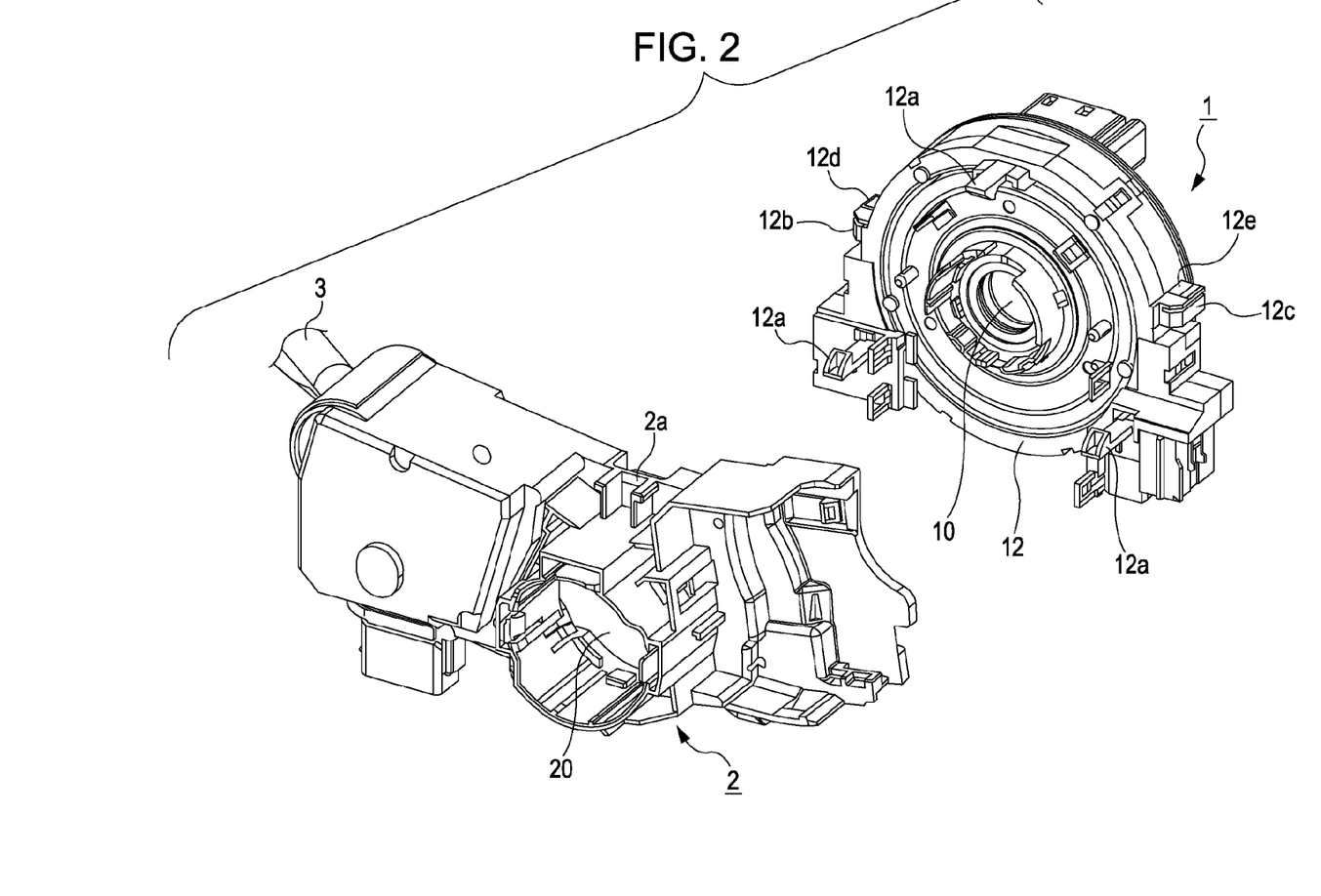
FIG. 2 is an exploded perspective view corresponding to FIG. 1 obliquely seen from below.
Figure 3:
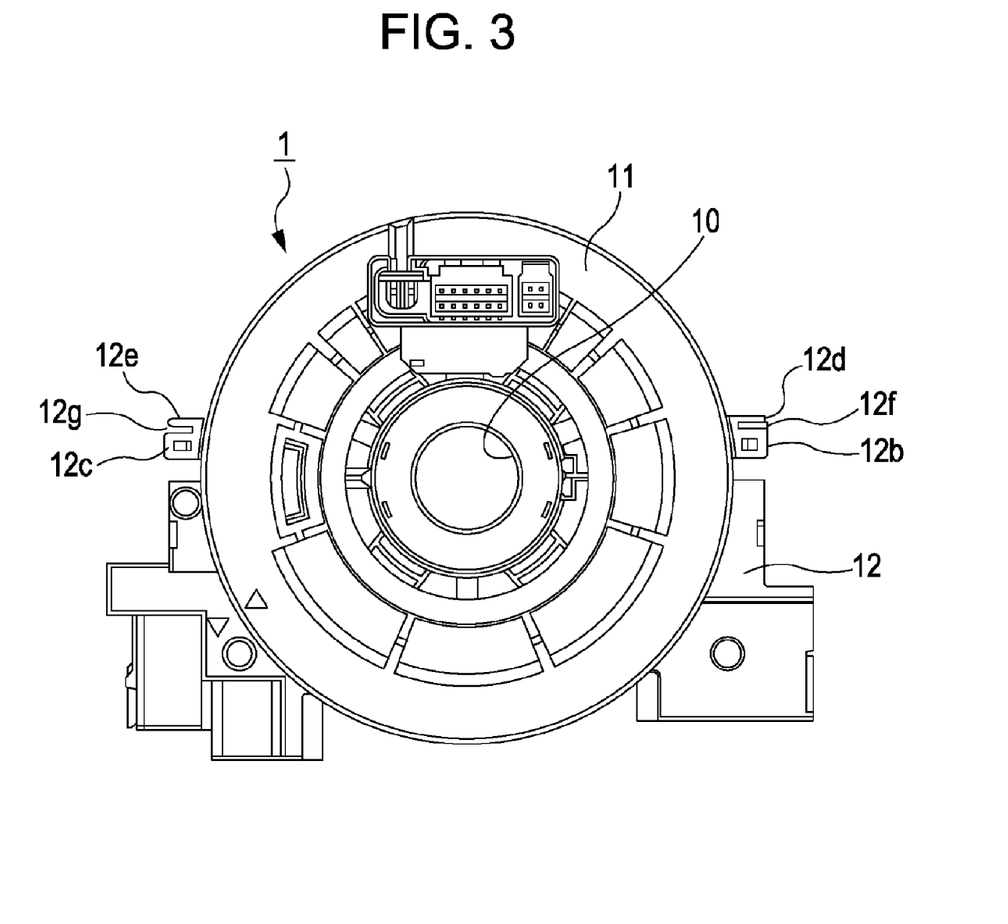
FIG. 3 is a top view of the rotating connector shown in FIGS. 1 and 2.

Referring to FIG. 2, hook-like snap claws 12a each extending toward the bracket 2 are provided on the bottom of the stator member 12 at three positions at equal angular intervals. Those snap claws 12a are snap connected to the bracket 2. Engaging protrusions 12b and 12c are formed on the outer wall of the stator member 12 at two positions circumferentially apart from each other at the angular interval of approximately 180°. The engaging protrusions 12b and 12c are provided with thin elastic tongue pieces 12d and 12e, respectively. The elastic tongue piece 12d adjacent to a slit 12f formed in the engaging protrusion 12b extends from the proximal end of the engaging protrusion 12b like a roof so as to be elastically deformable. Those engaging protrusion 12b and the elastic tongue piece 12d are inserted into an engaging recess groove 21 (to be described later) of the bracket 2. Likewise, the elastic tongue piece 12e adjacent to a slit 12g formed in the engaging protrusion 12c extends from the proximal end of the engaging protrusion 12c like a roof so as to be elastically deformable. Those engaging protrusion 12c and the elastic tongue piece 12e are inserted into the engaging recess groove 22 of the bracket 2. Upon insertion operation, the elastic tongue pieces 12d and 12e are elastically deformed under pressure, and the resultant reaction force serves to position the engaging protrusions 12b and 12c at predetermined positions inside the respective engaging recess grooves 21 and 22 to allow the stator member 12 to be positioned with respect to the bracket 2.

The rotating connector 1 is provided with a stopper member (not shown) for preventing free rotation of the rotor member 11 which is held in a neutral rotating state by the stopper member until the rotor member 11 is connected to the steering wheel.

The bracket 2 is formed by molding the synthetic resin material as a housing for the combination switch. The bracket 2 is integrated with a circuit substrate (not shown) with which connectors respectively drawn from the stalk switches 3 and the rotating connector 1 are directly coupled. The stalk switches 3 provided at the left and right sides of the bracket 2 (one of them is omitted in the drawing) are used for operating the turn signal lever or the windshield wiper.

Figure 1:
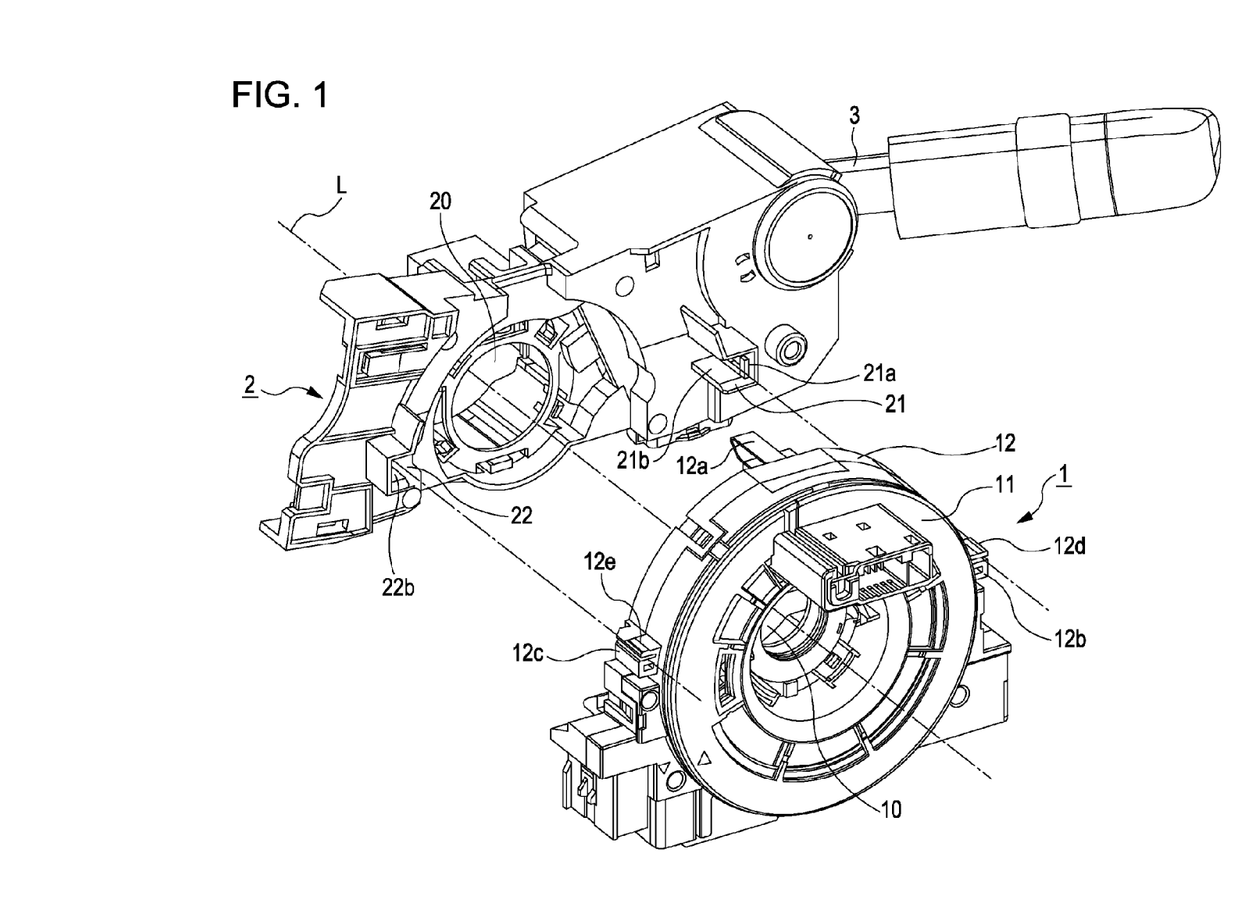
FIG. 1 is an exploded perspective view of a rotating connector attachment structure according to an embodiment of the present invention obliquely seen from above.
Figure 4:
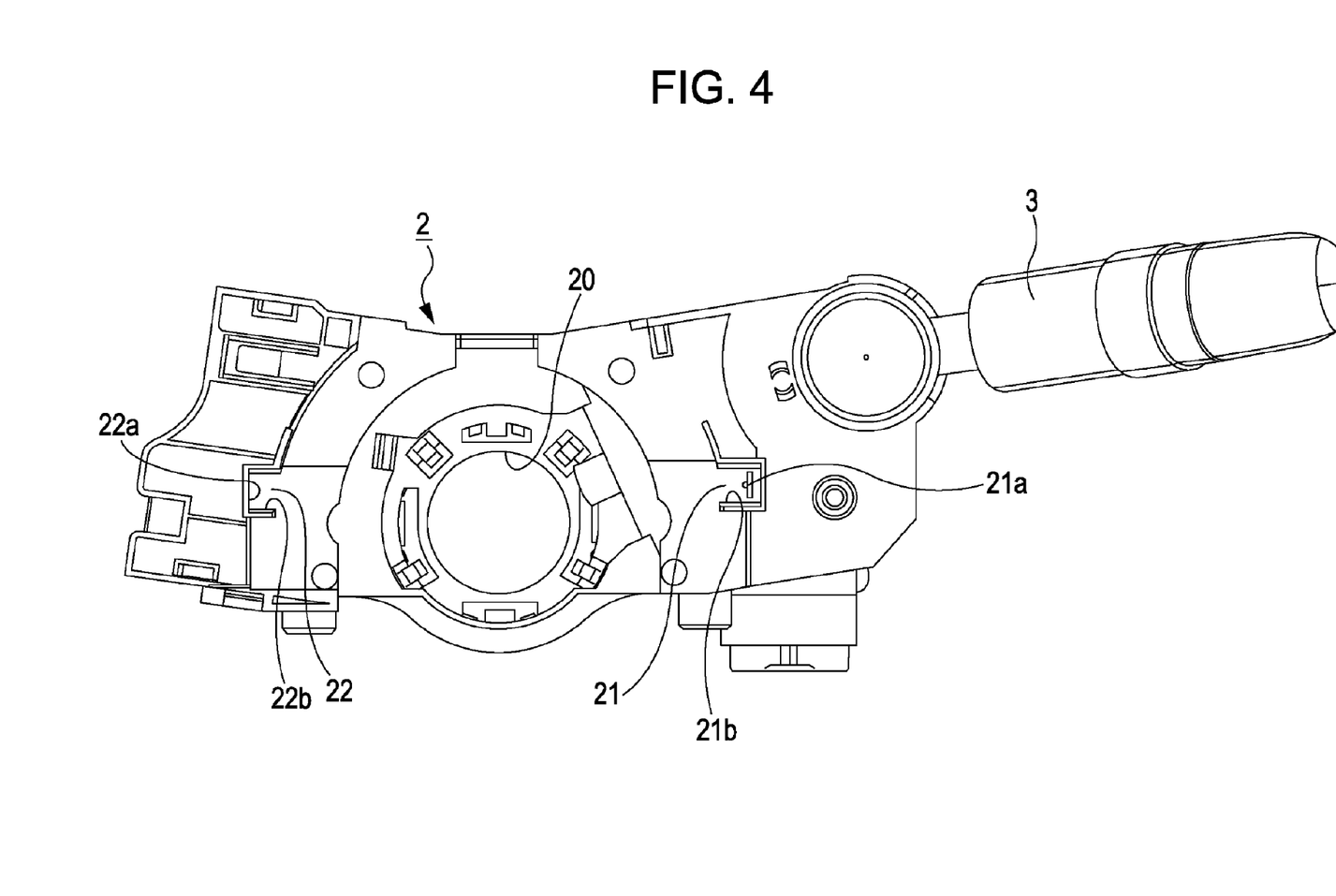
FIG. 4 is a plan view of the bracket shown in FIGS. 1 and 2.
Figure 5:
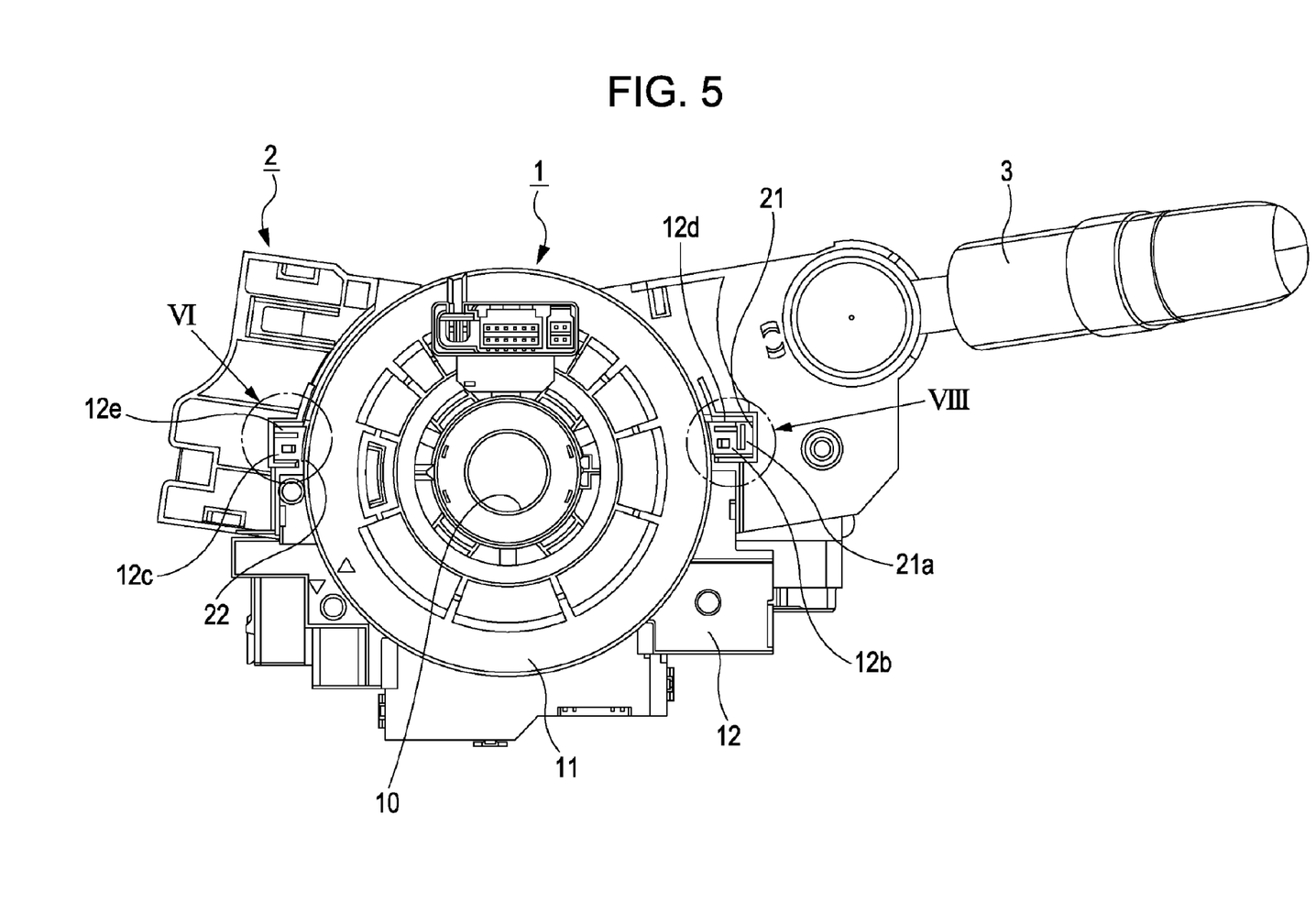
FIG. 5 is a top view showing the state where the rotating connector is attached to the bracket.
Figure 6:
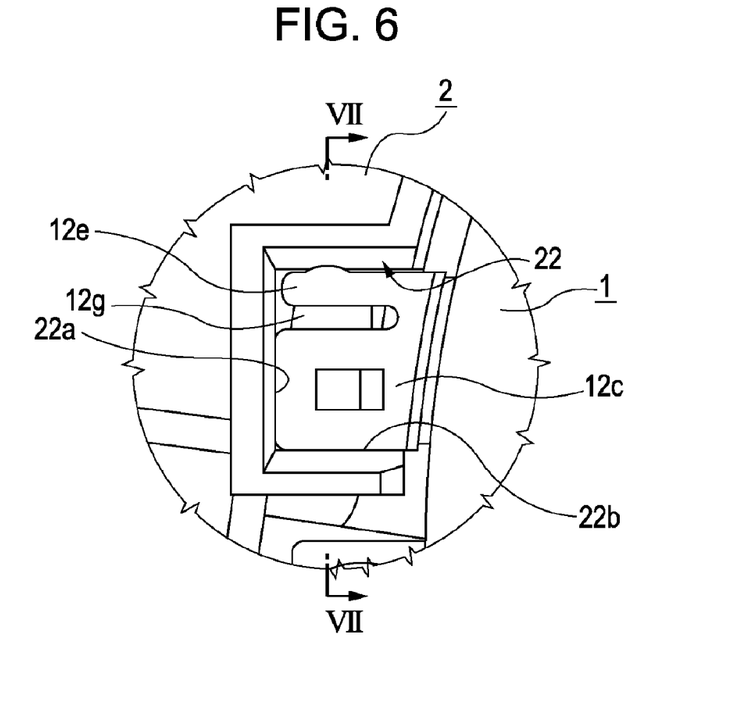
FIG. 6 is an explanatory enlarged view of a section VI shown in FIG. 5.
Figure 7:
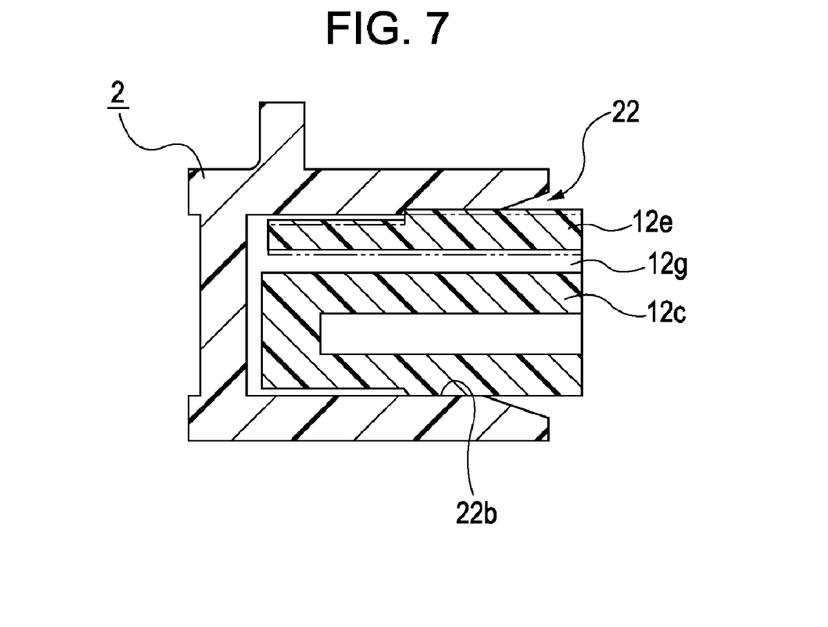
FIG. 7 is a sectional view taken along line VII-VII of FIG. 6.
Figure 8:
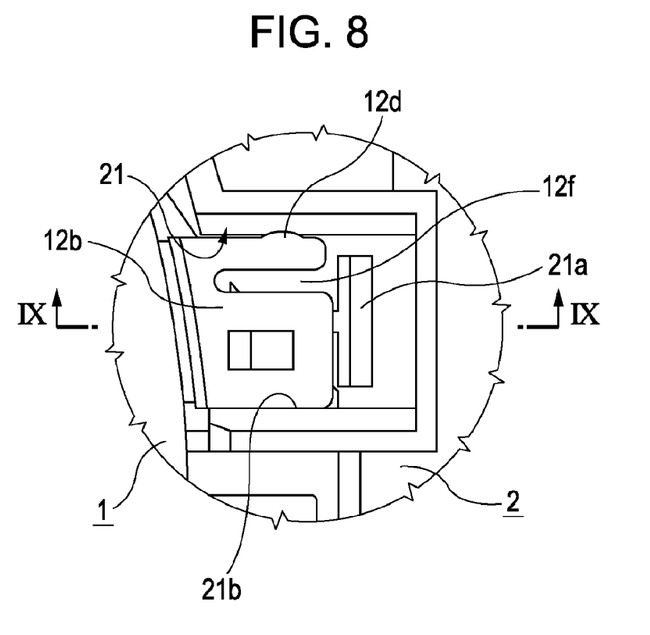
FIG. 8 is an explanatory enlarged view of a section VIII shown in FIG. 5.
Figure 9:
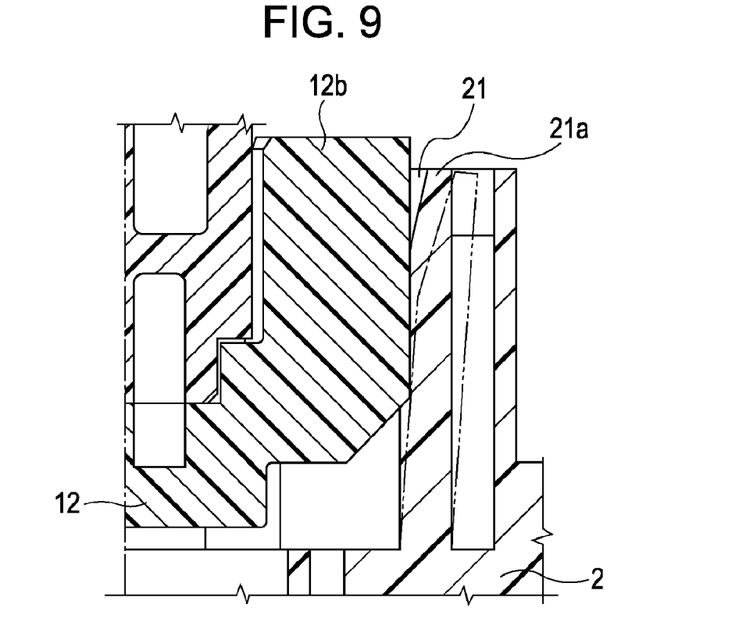
FIG. 9 is a sectional view taken along line IX-IX shown in FIG. 8.

The bracket 2 is provided with engaging stepped portions 2a (see FIG. 2) at positions corresponding to the respective snap claws 12a of the stator member 12. The rotating connector 1 is assembled with the bracket 2 fitted into the steering column (not shown) along the axial direction thereof from above such that the respective snap claws 12a are snap connected to the corresponding engaging stepped portions 2a. The engaging recess grooves 21 and 22 are formed in the upper surface of the bracket 2 at two opposite positions with respect to the center hole 20. Each of those engaging recess grooves 21 and 22 extends along the axial direction of the steering shaft while having the opposite side and the upper surface side opened. Referring to FIGS. 1 and 4, the engaging recess groove 21 is provided with a thin elastic tongue piece 21a. The other engaging recess groove 22 includes an inner wall surface 22a serving as a first reference surface opposite the elastic tongue piece 21a. An inner wall surface 21b of the engaging recess groove 21 and an inner wall surface 22b of the engaging recess groove 22 serve as second reference surfaces positioned in the same plane. Those second reference surfaces 21b, 22b are orthogonal to the first reference surface 22a. The first reference surface 22a and the second reference surfaces 21b, 22b are all arranged along the axial direction of the steering shaft. The engaging protrusion 12b inserted into the engaging recess groove 21 is positioned by the second reference surface 21b, and the engaging protrusion 12c inserted into the engaging recess groove 22 is positioned by the first and the second reference surfaces 22a and 22b.

The procedure for attaching the rotating connector 1 to the bracket 2 will be described. As described above, the bracket 2 is preliminarily fitted into the steering column (not shown) with high positioning accuracy. The engaging protrusion 12b and the elastic tongue piece 12d are inserted into the engaging recess groove 21 of the bracket 2 and the engaging protrusion 12c and the elastic tongue piece 12e are inserted into the engaging recess groove 22 while positioning the rotating connector 1 to the upper surface of the bracket 2. Then the elastic tongue piece 12d is elastically pressed against the engaging protrusion 12b as shown in FIGS. 5 to 8, and the elastic tongue piece 12e is elastically pressed against the engaging protrusion 12c. The resultant reaction force of the elastic tongue piece 12d urges the engaging protrusion 12b on the second reference surface 21b, and the reaction force of the elastic tongue piece 12e urges the engaging protrusion 12c on the second reference surface 22b. The engaging protrusion 12b is inserted into the engaging recess groove 21 while elastically pressing the elastic tongue piece 21a of the bracket 2. The engaging protrusion 12c is then urged on the first reference surface 22a under the reaction force of the elastic tongue piece 21a as shown in FIGS. 5, 6, 8 and 9. As a result, the stator member 12 is positioned with respect to the first reference surface 22a and the second reference surfaces 21b, 22b with high positioning accuracy, and the relative positional relationship between the stator member 12 and the bracket 2 in the plane orthogonal to the axial direction of the steering shaft may be defined with high accuracy. At a time point when the engaging protrusions 12b and 12c are inserted into the engaging recess grooves 21 and 22 to certain degrees, the respective snap claws 12a are snap connected to the corresponding engaging stepped portions 2a for fixing the rotating connector 1 to the bracket 2 while being positioned.

In the embodiment as described above, the engaging protrusions 12b and 12c of the stator member 12 are inserted into the engaging recess grooves 21 and 22 of the bracket 2 for attaching the rotating connector 1 to the bracket 2. This may urge the engaging protrusions 12b and 12c on the first reference surface 22a and the second reference surfaces 21b and 22b of the engaging recess grooves 21 and 22, respectively under the reaction force of the elastic tongue pieces 12d, 12e and 21a. The stator member 12 may be easily positioned with respect to the first reference surface 22a and the second reference surfaces 21b and 22b with high accuracy. Accordingly, the relative positional relationship between the stator member 12 and the bracket 2 in the plane direction orthogonal to the axial direction of the steering shaft may be easily defined with high accuracy.

In the present embodiment, the positioned rotating connector 1 is fixed to the bracket 2 through snap connection using the respective snap claws 12a. The rotating connector 1 may be easily positioned and fixed, thus considerably improving attachment operability. With the aforementioned attachment structure, the rotating connector 1 which has been once removed from the steering column for such operation as service and inspection may be easily attached again with high positioning accuracy. This makes it possible to improve the maintenance work of the rotating connector 1. Alternatively, the rotating connector 1 may be fixed to the bracket 2 through screwing rather than the snap connection.

The number of the engaging protrusions of the stator member 12 or the engaging recess grooves of the bracket 2 may be equal to or more than 3. Preferably, however, the engaging protrusions 12b, 12c are arranged at two positions apart from each other at an angular interval of approximately 180° in the circumferential direction of the stator member 12, and the engaging recess grooves 21, 22 are formed at two positions corresponding to the engaging protrusions 12b, 12c so as to perform highly accurate positioning while minimizing each number of the engaging protrusions and the engaging recess grooves.

The plural elastic tongue pieces for urging the engaging protrusions 12b, 12c of the stator member 12 on the first reference surface 22a and the second reference surfaces 21b, 22b of the bracket 2 may be formed on either the engaging protrusion or the engaging recess groove for providing the similar function. Preferably, the elastic tongue pieces for one of the reference surfaces (for example, the second reference surface) are formed on the engaging protrusions 12b and 12c, and the elastic tongue piece for the other reference surface (for example, the first reference surface) is formed in the engaging recess groove 21 so as to form the plural elastic tongue pieces effortlessly. The stator member 12 may be positioned to the first reference surface 22a substantially orthogonal to the line connecting the engaging recess grooves 21 and 22 using only the single elastic tongue piece 21a with high accuracy. However, likewise the elastic tongue pieces 12d, 12e for the second reference surfaces, two elastic tongue pieces 21a for the first reference surface may be formed.

What is claimed is:

1. A rotating connector attachment structure for attaching a stator member of a rotating connector having a rotor member rotatably assembled with the stator member to a bracket fitted into a steering column, wherein:

plural engaging recess grooves are formed in the bracket, having first and second reference surfaces which are orthogonal to each other and arranged along an axial direction of a steering shaft;

the stator member is provided with plural engaging protrusions respectively inserted into the plural engaging recess grooves along the axial direction; and a first elastic tongue piece for elastically urging the engaging protrusion on the first reference surface is formed on the engaging protrusion or in the engaging recess groove, and second elastic tongue pieces for elastically urging the engaging protrusions on the second reference surfaces is formed on the engaging protrusions or in the engaging recess grooves.

2. The rotating connector attachment structure according to claim 1, wherein:

the stator member is provided with the engaging protrusions at two positions in a circumferential direction at an angular interval of approximately 180°; and the bracket is provided with the engaging recess grooves at two positions corresponding to the engaging protrusions.

3. The rotating connector attachment structure according to claim 2, wherein one of the first and the second elastic tongue pieces is formed in the engaging recess groove, and the other elastic tongue piece is formed on the engaging protrusion.

4. The rotating connector attachment structure according to claim 3, wherein:

a line for connecting the pair of engaging recess grooves is substantially orthogonal to the first reference surface, and is substantially in parallel with the second reference surface; and the first elastic tongue piece is formed in one of the pair of engaging recess grooves, and the second elastic tongue pieces are provided on the pair of the engaging protrusions.

5. The rotating connector attachment structure according to claim 1, wherein:

plural snap claws are formed on the stator member; and the stator member is fixed to the bracket by performing a snap connection between the snap claws and the bracket.

* * * * *